Dec. 17, 1963 H. B. BOLAND 3,114,822
INDUSTRIAL HEAT TREATING DEVICE
Filed Aug. 23, 1960 3 Sheets-Sheet 1
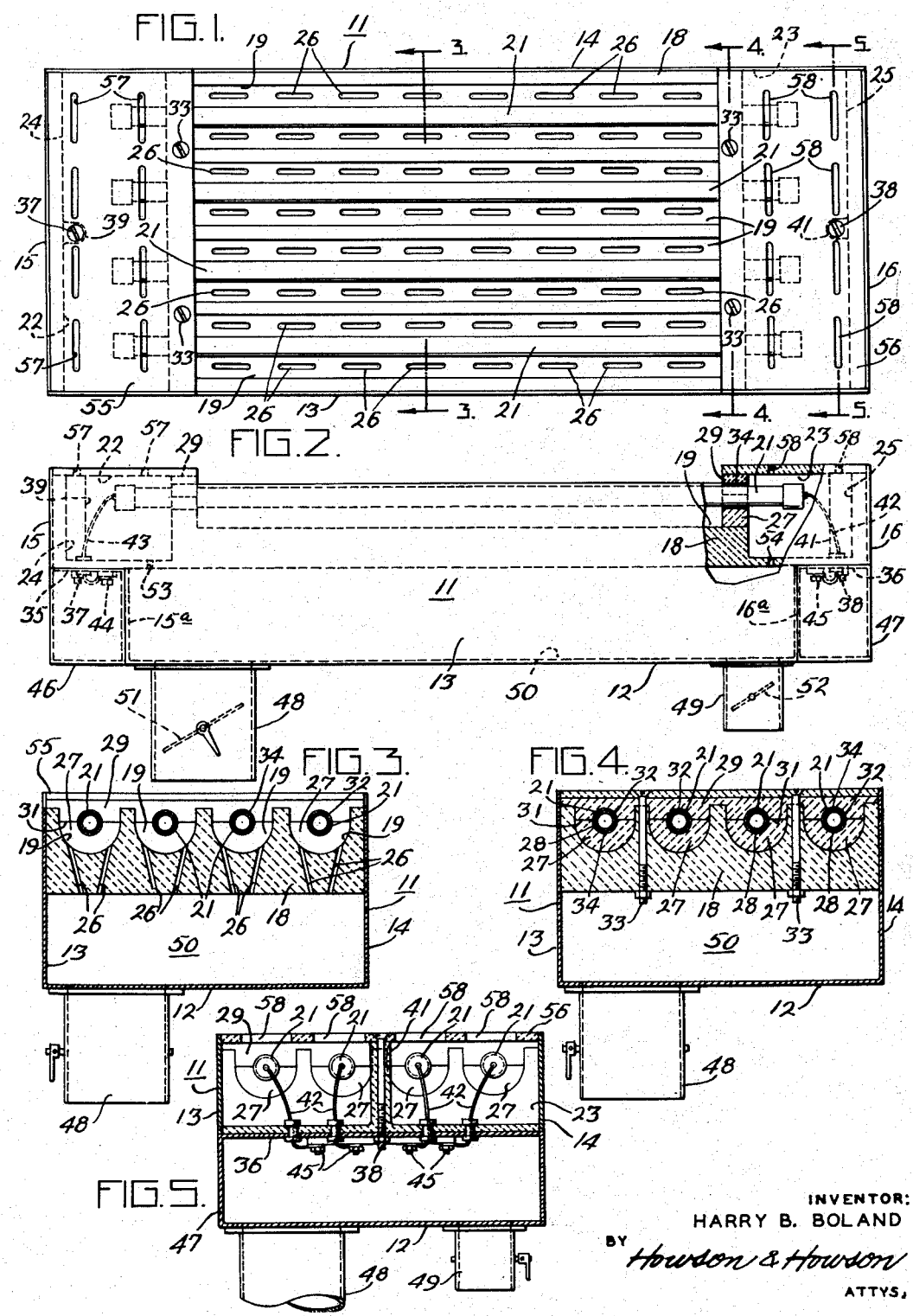
INVENTOR:
HARRY B. BOLAND
BY Howson & Howson
ATTYS.

Dec. 17, 1963  H. B. BOLAND  3,114,822
INDUSTRIAL HEAT TREATING DEVICE
Filed Aug. 23, 1960  3 Sheets-Sheet 2
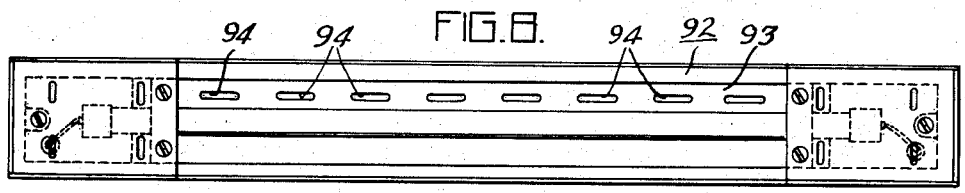
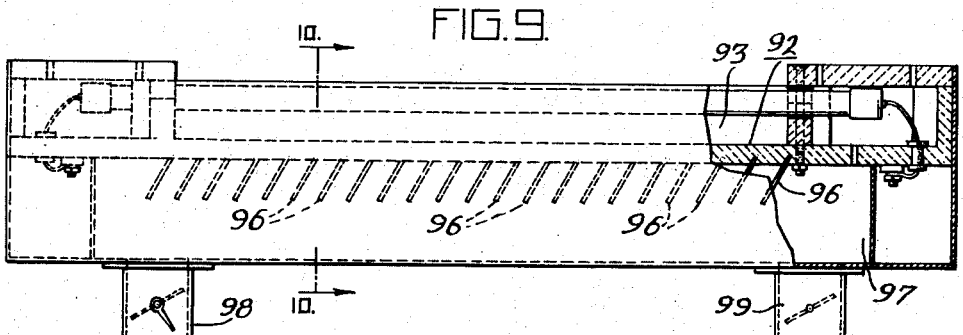
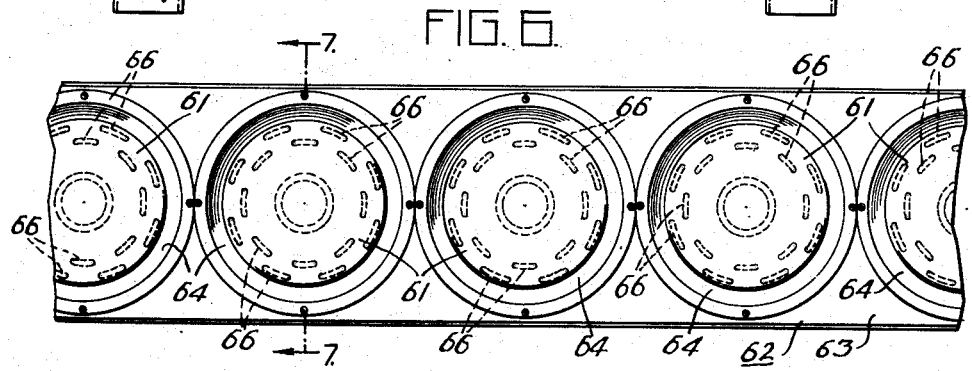
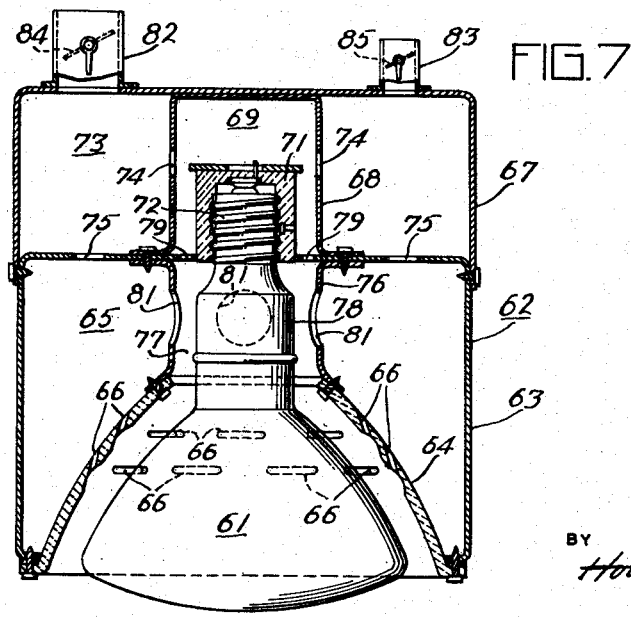
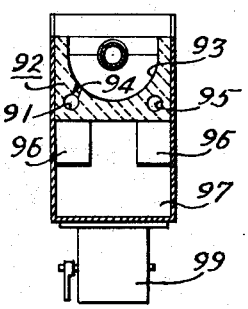
INVENTOR:
HARRY B. BOLAND
BY Howson & Howson
ATTYS Dec. 17, 1963  H. B. BOLAND  3,114,822
INDUSTRIAL HEAT TREATING DEVICE
Filed Aug. 23, 1960  3 Sheets-Sheet 3
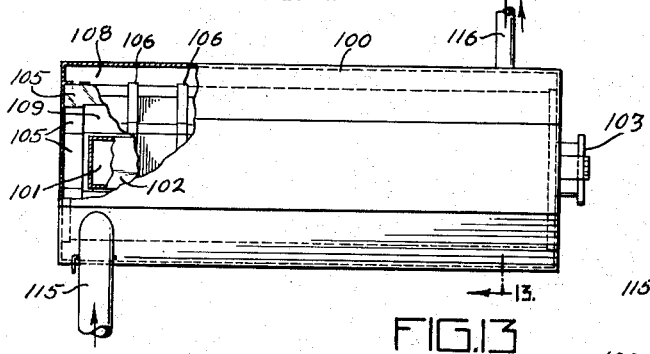
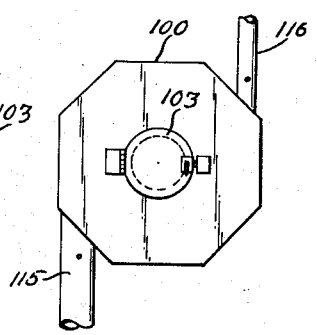
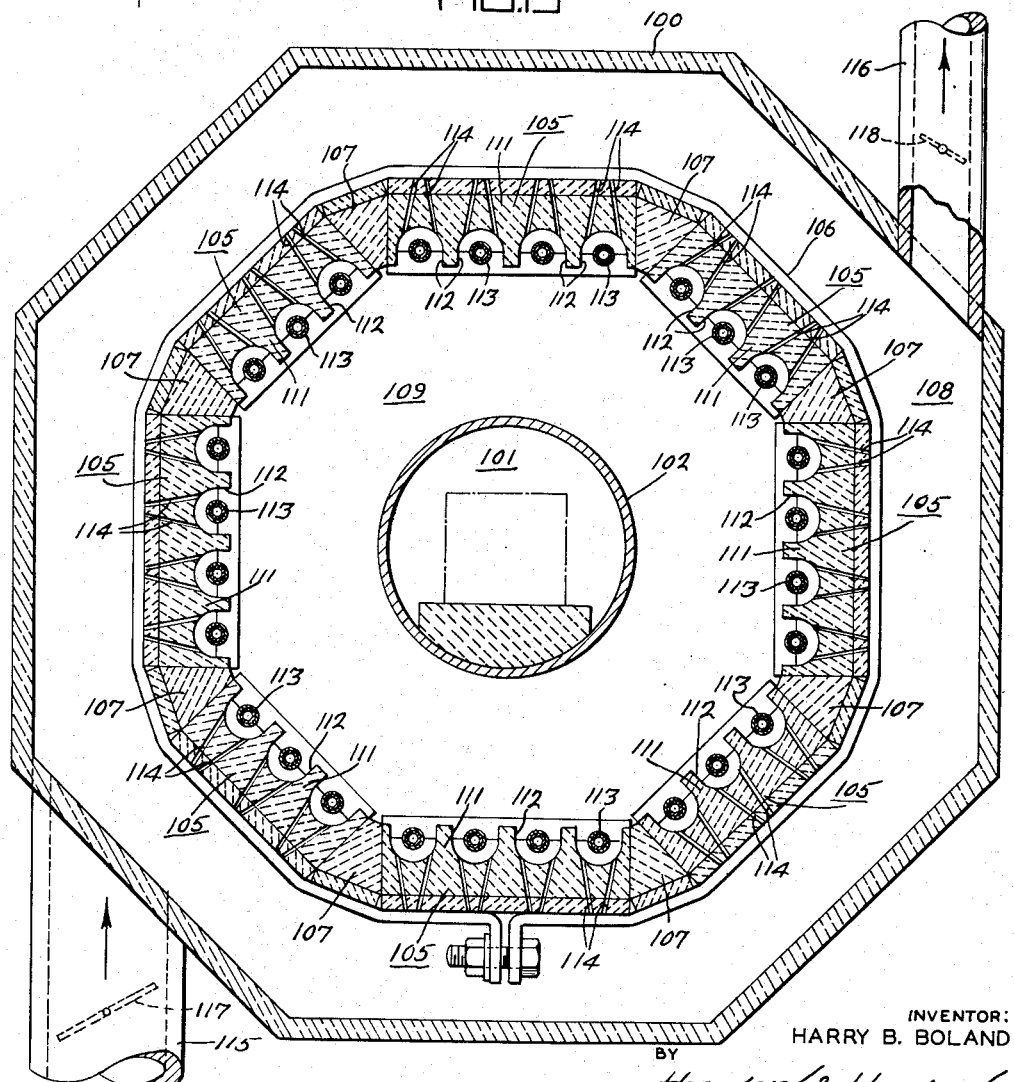
INVENTOR:
HARRY B. BOLAND
BY
Howton & Howton
ATTYS.

United States Patent Office 3,114,822
Patented Dec. 17, 1963

3,114,822
INDUSTRIAL HEAT TREATING DEVICE
Harry B. Boland, 501 Florence Ave., P.O. Box 55,
Jenkintown, Pa.
Filed Aug. 23, 1960, Ser. No. 51,399
6 Claims. (Cl. 219—35)

This invention contemplates provision of a heat directing and diffusing unit for industrial heat-treating apparatus adapted in principle to accommodate any of the several types, capacities, sizes and shapes of industrial electric heating elements. The invention is applicable both to portable and stationary industrial heat-treating equipment including electric ovens, and electric furnaces.

This is a continuation-in-part of my co-pending application, Serial Number 659,065, filed May 14, 1957, now abandoned.

A primary object of the invention is to materially improve the functional characteristics of industrial heat-treating processing apparatus.

An object of this invention is to diffuse the heat as well as the atmosphere without loss of useful heat, this by utilization of air flow precisely controlled both as to volume and velocity. The manner in which this regulated air flow is obtained constitutes an important feature of the invention.

Another important feature of the invention resides in the utilization of a major part of the stored heat, lost in conventional apparatus, to increase economy of operation.

Still another object of the invention is to materially reduce the overall weight of industrial heat-treating apparatus of this class by utilizing the aforesaid controlled air flow to permit measurable reduction in the thickness of the commonly used heat insulating media.

The invention contemplates also adaptation of equipment of the aforesaid improved functional characteristics for use in industrial heat-treating equipment of the type employing special atmosphere in the heat-treating process, and also in apparatus which does not use such special atmosphere.

The invention will be more readily understood by reference to the attached drawings wherein:

FIG. 1 is a plan view of a four-element heating unit embodying the principles of the invention;

FIG. 2 is a side elevational view partly in section of the unit shown in FIG. 1;

FIG. 3 is a sectional view on the line 3—3, FIG. 1;

FIG. 4 is a sectional view on the line 4—4, FIG. 1;

FIG. 5 is a sectional view on the line 5—5, FIG. 1;

FIG. 6 is a plan view of a unit employing a different form of heating element,

FIG. 7 is an enlarged sectional view on the line 7—7, FIG. 6;

FIG. 8 is a plan view of a single element unit adapted for use in special atmosphere processing industrial heat-treating apparatus;

FIG. 9 is a side elevational view partly in section of the unit shown in FIG. 8;

FIG. 10 is an enlarged sectional view on the line 10—10, FIG. 9;

FIG. 11 is a side elevational view partially in section of heat-treating apparatus embodying a plurality of heating units of the present invention;

FIG. 12 is an end elevational view of the apparatus of FIG. 11; and

FIG. 13 is an enlarged transverse sectional view taken on line 13—13, FIG. 11.

With reference to FIGS. 1 to 5 of the drawings, the unit therein disclosed comprises a casing 11 having a bottom wall 12 and side walls 13, 14, 15, and 16. The ends of the casing are undercut so that the lower parts 15a and 16a of the end walls 15 and 16 are inset from the upper parts. Mounted in the top of the casing 11 is a heat directing and diffusing member 18 which in the present instance contains four longitudinal troughs 19 of generally semicircular cross sectional contour in which are mounted the electrical heating elements 21. The troughs 19 occupy the midsection of member 18 and terminate at each end in a transverse chamber, 22 and 23 respectively, formed in integral end portions of the member, the outer side of the chamber being defined by end walls 24 and 25. The member 18 is provided in accordance with the invention with a plurality of ports 26 which extend upwardly from the under surface of the member, as shown in FIG. 3 into the troughs 19, the ports being arranged so that they enter the troughs more or less tangentially with respect to the curved bottoms thereof for a purpose hereinafter described. In the present instance, these ports are in the form of slots elongated longitudinally of the troughs as shown in FIG. 1.

At each end of each of the troughs 19 is a support for the elongated heating elements 21. In the present instance these supports comprise segmental elements 27 which are shaped to fit the contour of the troughs and which have in their upper straight surfaced recesses 28 forming contact seats for the ends of the heating elements, as best shown in FIG. 4. The support means also comprises a clamping member 29 which extends the full width of the section 18 and which has at the underside depending portions 31 which seat upon the upper surfaces of the elements 27 and which contain contacts 32 complementing the contacts 28 of said elements. The ends of the tubular heating elements are thus confined between the elements 27 and member 29 and are thereby supported in proper position in the troughs. Bolts 33 pass through the body of the section 18 and through the member 29 and, as shown in FIG. 4, secure the elements 27, member 29 and member 18 together and clamp the heating elements 21 in the sockets. A layer 34 of refractory wool or other insulating material may be interposed to advantage between the surfaces of the contacts and the tubular heating elements.

As shown in FIG. 2, the member 18 seats on the under walls 35 and 36 of the casing 11 which extend between the upper edges of the lower end wall sections 15a and 16a and the lower edges of the upper end wall sections 15 and 16. Bolts 37 and 38 extend downwardly through internal bosses 39 and 41 on the end walls 24 and 25 of member 18 and through the underlying casing walls 35 and 36 and secure member 18 in the casing. As shown in FIGS. 1 and 2, the elongated heating elements 21 project at their opposite ends into the chambers 22 and 23, and the elements are connected to a suitable source of electrical energy by connectors 42 and 43 which extend downwardly through the bottoms of the said chamber and connect with terminal elements 44 and 45 on the underside of the walls 35 and 36 of the casing. The space occupied by the terminals 44 and 45 are preferably enclosed by suitable housings 46 and 47 attached by suitable means (not shown) to the casing 11.

Within the casing 11, the area between the bottom wall 12 and the under surface of member 18, and between the lower end walls 15a and 16a of the casing forms a plenum chamber 50 to which air or other gaseous medium may be fed through an inlet duct 48 and from which air may be discharged through a discharge duct 49. Both ducts are provided with automatic valves 51 and 52, respectively, by which the pressure of air in the chamber can be closely regulated. Ports 53 and 54 in the bottom walls of chambers 22 and 23 establish communication between these chambers and chamber 50. Coverplates 55 and 56 for the chambers 22 and 23, detachably secured by the bolts 33 and 38, are also provided with apertures 57 and 58 to connect the chambers 22 and 23 to atmosphere. If the pressure of air in chamber 50 exceeds atmospheric, air will pass through the apertures 26 to the troughs 19 and through the chambers 22 by way of ports 53 and 54 and ports 57 and 58.

It is contemplated that the active heat directing and diffusing area of the unit shall be effectively insulated from the other parts of the unit. To this end the member 18 and the members 27 and 29 which support the ends of the elements 21 may be made of refractory material of high insulating value such as silicon carbides and metallic alloys. These members then form a solid insulating wall between the chambers 22 and 23 and the troughs 19 which constitute the active work zone of the unit. It is not essential however that any of these members have in themselves high insulating properties as hereinafter explained. Also, if desired, the inner walls of the chambers 22 and 23 may be provided with insulation in the form for example of refractory wool. By this and other means hereinafter described a higher percentage of process heat is kept in the active work zone where it can perform useful work, and the contact fittings and other elements of apparatus outside of said zone may be maintained at efficient operating temperatures of the elements due to excessive heat.

One important function of the slots is to maintain the temperature of the member 18 at the heat directing and diffusing surfaces below a temperature destructive to the elements 21. Heat generated in the elements tends to accumulate in the member 18 with ultimate temperatures materially in excess of the normal operating temperatures of the elements, and this accumulated heat if not dispersed, will be destructive of the elements. By regulated air flow through the slots from chamber 50 I have found it possible to maintain the temperature of the directing member 18 at the directing and diffusing surfaces approximately at the temperatures of the elements themselves, this substantially balanced condition precluding a condition such as described above harmful to the elements.

The air flow through the slots has still another important function, namely, to reduce heat loss to a minimum by concentrating substantially all of the generated heat in the active work zone. This is accomplished in part by reducing to a minimum the quantity of heat stored in the member 18. The air moving through the member effects a continuous transfer of heat from the member to the work zone, a correlary of this transfer being that the thickness of the member may be materially reduced with correspondingly small storage capacity without, however, any loss of heat to areas remote from the work zone. Reduction in thickness of the member affects a corresponding economy in the weight of the unit.

It should be understood that the volume and velocity of air passing through the ports 26 are relatively small, being only sufficient to maintain the heat directing member 18 at the active directing surfaces at or near to the normal operating temperature of the heating elements. If this ideal condition prevails the heat loss in the work zone due to the influx of cooling air is desirably low and the heating efficiency is maintained at a high level. It is possible, of course, where the heating elements are capable of operating under relatively high working temperatures, and the material of the heat directing member is also capable of corresponding sustained high temperatures to regulate the air flow so that an effective balance may be maintained at a relatively high temperature exceeding the normal heat emitting temperature of the element. In general, however, I have found that a balanced temperature corresponding to the normal operating temperature of the heating element affords the best overall results including uniformly sustained high heating efficiency and long useful life.

By segregating the electrical connections of the heating elements from the active heating zone as described, and by providing means for air movement around the contacts and immediately associated elements at a velocity and in volume adequate to maintain the terminal ends of the tubes and the associated connection at the most efficient temperatures below those at which rapid deterioration occurs, I am able to prolong the useful lives of the tubes materially beyond that previously obtainable in conventional apparatus of this class.

As previously set forth and as illustrated in FIG. 3, the ports 26 are preferably arranged so that the air passing therethrough into the troughs 19 may flow along the surface of the trough in the form of a slowly moving film, avoiding any direct impingement on the element 21. The air movement is very slow, and the pressure in chamber 50 is regulated accordingly.

The heat directing and diffusing unit illustrated in FIGS. 6 and 7 is adapted for use with heating elements of globular type having a conventional screw or other base. The illustrated unit is adapted for use with a series of heating elements 61. The unit consists of a housing 62 common to all of the elements, the lower section 63 of which contains the heat directing member 64. The members 64 have a series of slotted ports 66 opening from the chamber 65 of the lower housing section 63.

The housing 62 has an upper section 67 which comprises a series of cylindrical inner housings 68 which form inner compartments 69 housing the individual sockets 71 which receive the threaded bases 72 of the heating elements 61. The chamber 73 of upper casing section 67 communicates with the compartments 69 through ports 74 and with the chamber 65 through ports 75 in the upper wall of the lower casing section 63. The elements 64 terminate at the top in cylindrical partitions 76 which form chambers 77 housing the bases 78 of the heating element 61, and these chambers communicate with chambers 69 through ports 79 and with chambers 65 through ports 81. The chamber 73 has an air inlet port 82 and a discharge port 83 and these ports are regulated as to effective opening by suitable valves 84 and 85. Air pressure in the chamber 73 of the casing will discharge through the ports 74 and 75 into the chambers 69 and 65, respectively. Air passing through the ports 74 will pass from the chamber 69 downwardly around and over the surfaces of the heating element contacts 71 to chambers 77 and thence through the interiors of the heat directors 64 to atmosphere. Air pressure in the chamber 65 will move by way of the slotted apertures 66 through and over the heat directing surface of 64. It will be noted also that air is free to flow through ports 81 around the base portions of the elements 61 and downwardly around the sides of the said element to atmosphere. The design described above provides for maintaining the member 64 at a temperature preclusive of the deleterious effects to the member or the element 61 due to heat emanating from the latter, as described above, without loss of heat in the active working zone. Similarly, the design provides for maintenance of the contact portions of the element 61 at temperatures precluding adverse effects of the prolonged high temperatures to which they have been subjected in prior devices of like character. Here again the regulated pressures are such that the air flow is of extremely low velocities.

The embodiment of FIGS. 8, 9, and 10 corresponds in all essential respects to that of FIG. 1 except that a single heating element is used and the unit is equipped for operation with special atmosphere in the heating zone. Admission of the special atmosphere medium to the working zone is provided for by a duct 91 extending longitudinally through the deflecting member 92 and opening to the trough 93 through a series of ports 94. Access to the duct for connection to a source of the said medium may be had from one or both ends of the member 92. A corresponding tube 95 is shown at the opposite side of the member for reception of a thermocouple.

In this instance air is to be excluded from the work-zone. In order to maintain a balanced temperature condition in the unit such as previously described, I provide the member 92 with a series of heat conducting fins 96 which project from the underside thereof into the plenum chamber 97 through which air flows as previously described from inlet 98 to discharge port 99. Heat is thus continuously withdrawn from the heat deflecting surfaces of the member 92 through the member to the fins 96.

FIGS. 11, 12, and 13 illustrate heat treating apparatus or the like made in accordance with the present invention embodying a plurality of the above described heat treating units. This apparatus is specifically designed to provide a uniform temperature at all points within the heat treating chamber or zone and supply a uniform quantity of heat to all parts of the work piece to be treated. This apparatus, because of the specific arrangement of the heating units, prevents the development of hot or cold areas within the heat treating chamber.

With reference to FIGS. 11, 12, and 13 there is illustrated a heat treating furnace having an exterior wall or casing 100 which may or may not be insulated, as desired, and containing a heating zone or chamber 101 which is illustrated in the drawings as being surrounded by a muffle or tubular casing 102 extending axially of the furnace. In the illustrated embodiment of the present invention the furnace is shown as designed for a batch heat treating operation rather than a continuous process and the heat treating zone or chamber 101 terminates at the rear wall of the furnace. An insulated door 103 in the front wall of the furnace provides access to the heat treating chamber 101 and permits articles to be inserted into the chamber and thereafter removed from the chamber. If desired, a refractory block or stand 104 may be provided within the heat treating chamber to receive and support the work pieces to be treated. It will be understood however, that the muffle will not be necessary for certain heat treating operations, as set forth hereinafter.

In accordance with the present invention a plurality of heating units 105 are positioned within the furnace intermediate the outer casing 100 and the tubular casing 102 and extending in a longitudinal direction within the furnace substantially equally spaced from the inner tubular casing 102. These heating units 105 are similar to those illustrated and described in FIGS. 1 to 5 of the drawings and may be secured together, for example, by means of metal straps 106 with wedge shaped refractory blocks 107 provided between adjacent heating units, as illustrated in FIG. 13, with the heating units and spacers extending from the front wall to the rear wall of the furnace and supported by the front and rear walls. This effectively divides the furnace into an outer chamber 108 positioned between the outer casing and the heating units and an inner chamber 109 positioned between the heating units and the tubular casing 102 with both chambers extending longitudinally of the furnace for the full length thereof.

Each heating unit 105 includes a heat directing and diffusing member 111 which, in the present instance, contain a plurality of longitudinally extending troughs 112 of generally circular cross-sectional contour in which are mounted electric-heating elements 113. In accordance with the present invention a plurality of ports 114 extend transversely through the heat directing and diffusing member 111 terminating at the troughs 112. The ports 114 are arranged so that they enter the troughs more or less tangentially with respect to the curved bottoms thereof. Preferably the heat directing and diffusing members 111 are made of two separate sections with the inner section containing the troughs being formed of a heat absorbing refractory material and the outer section extending along the rear surface of the member remote from the heating elements 113 being formed of a heat insulating material.

According to the present invention, air or other gaseous material is permitted to circulate around the outer surface of the heating units 105 within the chamber 108 to maintain a controlled flow and pressure within this chamber. Accordingly, an inlet pipe 115 is provided at one end of the chamber 108 and an outlet pipe 116 is provided at the other end of the chamber 108 with the adjustable dampers 117 and 118 positioned within the inlet and outlet pipes 115 and 116, respectively, to control the passage of the air or gaseous medium.

Heat treating apparatus similar to that illustrated in FIGS. 11, 12, and 13 of the drawings may be used to heat treat work pieces by radiation, contact, and convection. Heat treating by radiation is normally accomplished at a low temperature for example up to 500 degrees F. In this instance, no muffle will be provided surrounding the heat treating zone and the work piece may be supported within the zone on a table, dolly or other conventional material handling device. Heat treating in this apparatus by contact is normally carried out within the range of 1100 degrees F. to 1600 degrees F. and is similar to heat treating in a bath such as an oil bath or salt bath in that the air or other treating medium is heated to a uniform temperature and completely surrounds the work piece to be treated. With this, there is in effect, a mass of heated medium about the work piece or about the muffle in exactly the same manner as heat treating in an oil or salt bath. This mass of heat treating medium is maintained at a constant desired temperature by the heating units. In this use, there will be no movement imparted to the heating medium. Heat treating by convection is normally carried out at about 2000 degrees F. with a maximum temperature being limited solely by the temperature which the refractory material will withstand. In this usage, the muffle will be heated to the desired temperature and heat will be transmitted to the work piece by convection from the muffle.

With this above construction, there is little or no movement of air or gas within this chamber. Heat is applied to the tubular housing 102 or to any work piece placed in the treating zone 101 uniformly about the heating zone of the various heating elements 113 so that with the resulting absolute minimum amount of circulation of gaseous medium there are no hot or cold spots about the tube 102 and the tube 102 is heated to a uniform temperature throughout. This heat is transmitted through the tube 102 to heating chamber 101 thereby providing in the heating chamber 101 a uniform temperature at all points.

While various modifications of the present invention have been illustrated and desribed herein, it is not intended to limit the invention to such a disclosure and changes and modifications may be incorporated and embodied therein within the scope of the following claims.

I claim:

1. In a heat generating and diffusing unit for heat treatment of work located in a treating zone, a refractory member having a forward surface confronting said zone and a trough in said surface, an electrical heating element disposed in said trough, a chamber in said member at each end of the trough and a wall separating the trough from each of the chambers, means in each said wall for supporting said electrical heating element in the trough with the ends of said heating element in the respective end chambers, means forming a third chamber at the rear of the said refractory member, apertures in the refractory member extending from said third chamber to the surface of the trough and to the said two end chambers, means for admitting a gaseous medium to the said third chamber, and means for regulating the pressure of the medium in said third chamber.

2. In a heat generating and diffusing unit for heat treatment of work located in a treating zone, a refractory body of high heat absorbing and storage capacity forming a wall of and having extended surface confronting said zone, a heating element spaced from said surface and positioned between the surface and the work heating zone and in non-conductive relation with said refractory body, said refractory body having a recess which wholly receives said heating element except a side exposed toward said treating zone, means for admitting a gaseous medium to the work treating zone, said means for admitting a gaseous medium to the treating zone including passages formed in said refractory body opening into said recess below and alongside of said heating element to direct the gaseous medium alongside past said heating element and means for adjustably regulating the rate of flow of said gaseous medium so as to afford a substantially uniform, non-turbulent distribution of heat and gaseous medium in said treating zone.

3. In a heat generating and diffusing unit for heat treatment of work located in a treating zone, a refractory member of high heat absorption and storage capacity having extended surface confronting said zone, a heating element, means for supporting said heating element in spaced relation to said surface and between the said member and the treating zone, said surface being formed with a concavity to embrace the sides of said heating element not exposed to the treating zone to intercept radiant heat from the element not directed into the zone, apertures in the said surface and extending through the member into said concavity below and alongside of said heating element to direct the gaseous medium alongside past said heating element, in substantially uniform distribution over the entire surface and throughout the member, means for delivering a gaseous medium through the apertures to the said zone, and means for controlling the rate of said delivery.

4. Apparatus for heat treating by radiation a work piece located in a treating zone comprising, a housing, a plurality of heating units positioned within said housing intermediate said treating zone and said housing surrounding said treating zone, each of said heating units including a refractory member having a forward surface facing toward said zones and a trough in said surface, electrical heating elements, means for supporting one of said electrical heating elements in each trough, said heating units together providing a chamber within said housing defined between said housing and said heating units, means defining a plurality of apertures in the refractory member of each of said heating units extending from said chamber to the surface of said trough, means for admitting a gaseous medium to said chamber, and means for regulating the flow of the medium in said chamber.

5. Apparatus in accordance with claim 4 wherein said treating zone extends longitudinally of said housing and is coaxial with said housing and wherein means are provided defining an access opening to said container to permit a work piece to be placed within said zone.

6. Apparatus in accordance with claim 4 wherein the surface of said refractory members remote from said forward surface is covered with a heat insulating material and wherein said openings extend through both said refractory members and said heat insulating material.

References Cited in the file of this patent

UNITED STATES PATENTS

| | | |
|---|---|---|
| 1,575,211 | Kempston et al. | Mar. 2, 1926 |
| 1,762,201 | Strong | June 10, 1930 |
| 1,837,179 | Benner et al. | Dec. 15, 1931 |
| 1,910,700 | Lebau | May 23, 1933 |
| 1,910,701 | Lebau | May 23, 1933 |
| 1,924,201 | Schuffler | Aug. 29, 1933 |
| 2,076,485 | Streyman et al. | Apr. 6, 1937 |
| 2,239,957 | Genda | Apr. 29, 1941 |
| 2,611,790 | Koch | Sept. 23, 1952 |
| 2,784,243 | McAllister | Mar. 5, 1957 |

FOREIGN PATENTS

| | | |
|---|---|---|
| 745,700 | Great Britain | Feb. 29, 1956 |